United States Patent
He et al.

(10) Patent No.: US 12,342,231 B2
(45) Date of Patent: Jun. 24, 2025

(54) CELL RESELECTION METHOD AND ELECTRONIC DEVICE

(71) Applicant: VIVO MOBILE COMMUNICATION CO., LTD., Dongguan (CN)

(72) Inventors: Yi He, Dongguan (CN); Yanliang Sun, Dongguan (CN); Tianchuan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 300 days.

(21) Appl. No.: 17/951,067

(22) Filed: Sep. 22, 2022

(65) Prior Publication Data

US 2023/0012980 A1    Jan. 19, 2023

Related U.S. Application Data

(63) Continuation of application No. PCT/CN2021/081286, filed on Mar. 17, 2021.

(30) Foreign Application Priority Data

Mar. 24, 2020    (CN) .......................... 202010212374.5

(51) Int. Cl.
*H04W 36/00* (2009.01)
*H04W 36/08* (2009.01)
(Continued)

(52) U.S. Cl.
CPC . *H04W 36/0085* (2018.08); *H04W 36/00838* (2023.05); *H04W 36/08* (2013.01); *H04W 36/249* (2023.05); *H04W 36/302* (2023.05)

(58) Field of Classification Search
CPC ........... H04W 36/30; H04W 36/00838; H04W 36/0085; H04W 36/08; H04W 36/249;
(Continued)

(56) References Cited

U.S. PATENT DOCUMENTS

2012/0182896 A1   7/2012   Jang et al.
2013/0189996 A1   7/2013   Sridhar et al.
(Continued)

FOREIGN PATENT DOCUMENTS

CN    101984711 A    3/2011
CN    102088744 A    6/2011
(Continued)

OTHER PUBLICATIONS

International Search Report issued in corresponding International Application No. PCT/CN2021/081286, mailed May 31, 2021, 6 pages.
(Continued)

*Primary Examiner* — Ji-Hae Yea
(74) *Attorney, Agent, or Firm* — IPX PLLC (57) ABSTRACT

A cell reselection method, performed by an electronic device, includes: in a case of detecting that the electronic device performs ping-pong reselection in multiple cells, obtaining a number of reselections; in a case that the number of reselections reaches a preset number of times. The cell reselection method further includes determining a target cell among the multiple cells. Reference Signal Received Power (RSRP) fluctuation of the target cell is less than a preset fluctuation threshold. Reference Signal Received Quality (RSRQ) within a camping period is greater than a first threshold. The cell reselection method also includes setting an offset value and accessing the target cell according to the offset value.

10 Claims, 3 Drawing Sheets

(51) Int. Cl.
*H04W 36/24* (2009.01)
*H04W 36/30* (2009.01)

(58) Field of Classification Search
CPC ............. H04W 36/302; H04W 36/083; H04W 36/085; H04W 36/087; H04W 36/13; H04W 36/304; Y02D 30/70
See application file for complete search history.

(56) References Cited

U.S. PATENT DOCUMENTS

| | | | |
|---|---|---|---|
| 2013/0242774 A1* | 9/2013 | Wang | H04W 36/0085 370/332 |
| 2014/0274063 A1 | 9/2014 | Singh et al. | |
| 2015/0230114 A1 | 8/2015 | Delsol et al. | |
| 2016/0007260 A1 | 1/2016 | Abraham et al. | |
| 2016/0142957 A1* | 5/2016 | Hu | H04W 48/20 370/331 |
| 2016/0373995 A1* | 12/2016 | Kinthada Venkata | H04W 36/362 |
| 2017/0353897 A1 | 12/2017 | Wang et al. | |
| 2018/0270717 A1 | 9/2018 | Kakishima et al. | |
| 2022/0361251 A1* | 11/2022 | Yu | H04W 74/0833 |

FOREIGN PATENT DOCUMENTS

| | | |
|---|---|---|
| CN | 103281739 A | 9/2013 |
| CN | 109348516 A | 2/2019 |
| CN | 109600806 A | 4/2019 |
| CN | 110381546 A | 10/2019 |
| CN | 110602728 A | 12/2019 |
| CN | 110636560 A | 12/2019 |
| CN | 110650509 A | 1/2020 |
| CN | 111314985 A | 6/2020 |
| KR | 20110119274 A | 11/2011 |
| WO | 2017080514 A1 | 5/2017 |

OTHER PUBLICATIONS

First Office Action issued in related Chinese Application No. 202010212374.5 mailed Aug. 25, 2021, 6 pages.
Extended European Search Report issued in related European Application No. 21774880.5, mailed Jul. 13, 2023, 15 pages.
Chang Kwangrok et al., "LTE idle mode optimization improving end user experiences" 16th International Conference on Advanced Communication Technology, Global IT Research Institute(GIRI), 16 xp032581331, Feb. 2014, pp. 14-18.
CATT, "Ping-pong Cell Reselection Issue", 3GPP Draft, R2-1811247, Aug. 2018, 4 pages.
Examination Report issued in related Indian Application No. 202227047255 mailed Nov. 15, 2022, 9 pages.
Office Action issued in related European Application No. 21774880.5, mailed Mar. 19, 2025, 15 pages.
Office Action issued in related Indian Application No. 202227047255, mailed Mar. 29, 2025, 2 pages.

* cited by examiner

CELL RESELECTION METHOD AND ELECTRONIC DEVICE

CROSS-REFERENCE TO RELATED APPLICATIONS

This application is a continuation of International Application No. PCT/CN2021/081286, filed on Mar. 17, 2021, which claims priority to Chinese Patent Application No. 202010212374.5 filed in China on Mar. 24, 2020. The entire contents of each of the above-referenced applications are expressly incorporated herein by reference.

TECHNICAL FIELD

Embodiments of the present disclosure relate to the field of communications technologies, and in particular, to a cell reselection method and an electronic device.

BACKGROUND

In real network scenarios, an electronic device often performs ping-pong reselection in multiple cells due to network configuration or signal fluctuation.

In a standby state, ping-pong reselection also increases power consumption. When the electronic device is in a dual-card scenario, ping-pong reselection on a secondary card also affects a data service of a main card. Especially, the impact on a service with delay sensitivity, such as a game service is large.

SUMMARY

Embodiments of the present disclosure provide a cell reselection method and an electronic device.

According to a first aspect, an embodiment of the present disclosure provides a cell reselection method, applied to an electronic device, and the method includes:

in a case of detecting that the electronic device performs ping-pong reselection in multiple cells, obtaining a number of reselections, where the number of reselections is a number of times of camping on a cell with the largest number of times of camping among the multiple cells;

in a case that the number of reselections reaches a preset number of times, determining a target cell among the multiple cells, where reference signal received power RSRP fluctuation of the target cell is less than a preset fluctuation threshold, and reference signal received quality RSRQ within a camping period is greater than a first threshold;

setting an offset value; and accessing the target cell according to the offset value.

According to a second aspect, an embodiment of the present disclosure provides an electronic device, including:

an obtaining module, configured to: in a case of detecting that the electronic device performs ping-pong reselection in multiple cells, obtain a number of reselections, where the number of reselections is a number of times of camping on a cell with the largest number of times of camping among the multiple cells;

a determining module, configured to: in a case that the number of reselections reaches a preset number of times, determine a target cell among the multiple cells, where reference signal received power RSRP fluctuation of the target cell is less than a preset fluctuation threshold, and reference signal received quality RSRQ within a camping period is greater than a first threshold;

a setting module, configured to set an offset value; and an access module, configured to access the target cell according to the offset value.

According to a third aspect, an embodiment of the present disclosure provides an electronic device, including a processor, a memory, and a program that is stored in the memory and that can run on the processor, and when the program is executed by the processor, steps of the cell reselection method provided in the first aspect are implemented.

According to a fourth aspect, an embodiment of the present disclosure provides a computer-readable storage medium, where the computer-readable storage medium stores a computer program, and when the computer program is executed by a processor, steps of the cell reselection method provided in the first aspect are implemented.

In the embodiments of the present disclosure, when the number of ping-pong reselections reaches the preset number of times, the target cell is determined from the multiple cells, and the offset value is set. Based on the offset value, the electronic device accesses the target cell through reselection calculation. In this way, when ping-pong reselection occurs, the electronic device determines the target cell from multiple cells and accesses the target cell through optimization processing, thereby reducing the power consumption of the electronic device and reducing the data service delay.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

It should be noted that in this specification, relational terms such as "first" and "second" are used only to differentiate the same names, and do not imply a relation or sequence between these names.

The technology described in this specification is not limited to the 5th-generation (5G) system and subsequent evolved communications systems as well as LTE/LTE-Advanced (LTE-A) systems, and may also be applied to various wireless communications systems such as Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA) systems, and other systems.

The terms "system" and "network" are often interchangeably used. The CDMA system can implement radio technologies such as CDMA2000 and Universal Terrestrial Radio Access (UTRA). UTRA includes Wideband CDMA (WCDMA) and another CDMA variation. The TDMA system may implement a radio technology such as Global System for Mobile Communication (GSM). An OFDMA system may implement radio technologies such as Ultra Mobile Broadband (UMB), Evolved-UTRA (E-UTRA), IEEE802.11 (Wi-Fi), IEEE 802.16 (WiMAX), IEEE 802.20, Flash-OFDM and the like. UTRA and E-UTRA are parts of a Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in a document of an organization named "3rd Generation Partnership Project" (3GPP). CDMA2000 and UMB are described in the documents of the organization named the "3rd Generation Partnership Project 2" (3GPP2). The technologies described in this specification may be used in the systems and radio technologies mentioned above, and may also be used in another system and radio technology.

The electronic device provided in this embodiment of the present disclosure may be a mobile phone, a tablet computer, a notebook computer, an Ultra-Mobile Personal Computer (UMPC), a netbook, a Personal Digital Assistant (PDA), or the like.

To better understand the method of the embodiments of the present disclosure, the following technical contents are first described:

Cell reselection refers to a process in which an electronic device selects a best cell to provide a service signal by monitoring signal quality of neighboring cells and the current cell in an idle mode. When the signal quality and level of a neighboring cell satisfy the S criterion (Srxlev) and satisfy a reselection decision criterion, the electronic device accesses the cell to camp.

After the electronic device successfully camps on the cell, the electronic device continues to measure the cell. The Radio Resource Control (RRC) layer calculates Srxlev according to a Reference Signal Received Power (RSRP) measurement result, and compares the measurement result with an intra-frequency measurement start threshold (Sintrasearch) and an inter-frequency/inter-system measurement start threshold (Snonintrasearch) as a condition for determining whether to start neighboring cell measurement.

LTE cell reselection measurement criteria:

1. When priorities of cells indicated by a system message are higher than that of a serving cell, the electronic device always measures these high-priority cells.

2. For intra-frequency/same-priority cells, if the serving cell is greater than or equal to Sintrasearch, the electronic device performs measurement, and if the serving cell is less than Sintrasearch, the electronic device does not perform measurement.

3. When priorities of cells indicated by a system message are lower than that of the serving cell, if an S value of the serving cell is less than or equal to Snonintrasearch, the electronic device performs measurement, and if the S value of the serving cell is greater than Snonintrasearch, the electronic device does not perform measurement.

4. If a Snonintrasearch parameter is not broadcast in a system message, the electronic device starts inter-frequency cell measurement.

The above S value is Srxlev in cell selection.

S criterion=RSRP value of the measured cell-{minimum reception level (usually 0-128 dbm)+minimum reception level offset (usually 0)}-power compensation (usually 0)

Corresponding formula: Srxlev=Qrxlevmeas-(qRxLevMin+qRxLevMinOffset)-pCompensation.

Figure 1:
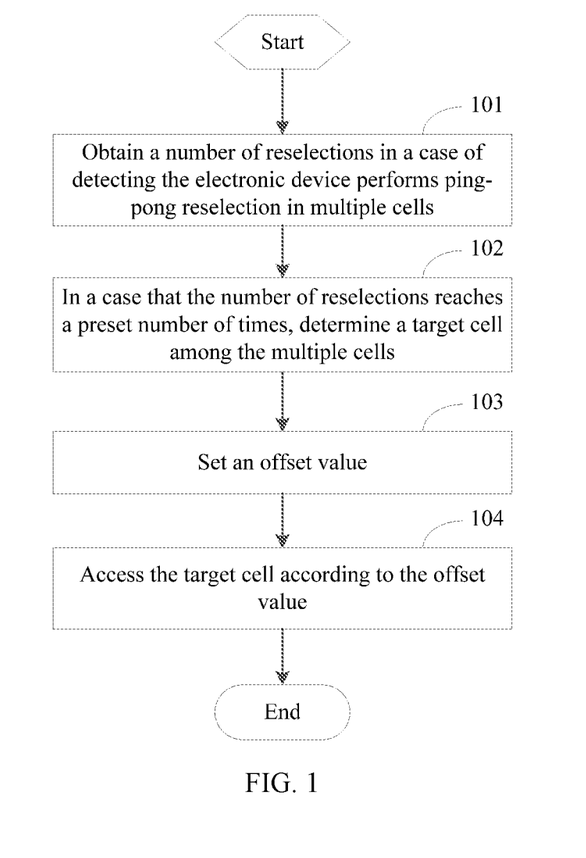
FIG. 1 is a schematic flowchart 1 of a cell reselection method according to an embodiment of the present disclosure.

Referring to FIG. 1, an embodiment of the present disclosure provides a cell reselection method. The method is performed by an electronic device, and the method includes the following steps:

Step 101: Obtain a number of reselections in a case of detecting that the electronic device performs ping-pong reselection in multiple cells.

In this embodiment of the present disclosure, when the electronic device detects that ping-pong reselection is performed in multiple cells, the number of times of reselection is recorded.

The number of reselections is a number of times of camping on a cell with the largest number of times of camping among the multiple cells. In some embodiments, within a fixed period of time, the electronic device performs ping-pong reselection among multiple cells, and the number of times of camping corresponding to the cell with the largest number of times of camping in reselection is used as the number of reselections. For example, multiple cells include cells A, B, and C, and the corresponding ping-pong reselection process is A→B→A→C→A, where cell A has the largest number of times of camping. Therefore, the obtained number of reselections is 3.

Step 102: In a case that the number of reselections reaches a preset number of times, determine a target cell among the multiple cells.

It can be understood that the cell reselection method of the embodiments of the present disclosure can be applied to an electronic device as an optimization function, and the number of reselections obtained in step 101 can be used as a triggering condition for starting optimization.

In this embodiment of the present disclosure, when the number of reselections reaches a preset number of times, the target cell is determined from the multiple cells, and the target cell may be called an optimized cell.

RSRP fluctuation of the target cell is less than a preset fluctuation threshold, and Reference Signal Received Quality (RSRQ) is greater than a first threshold within the camping period. The first threshold value may be recorded as Q1; and the target cell is determined based on the RSRP fluctuation and the RSRQ.

The above-mentioned RSRP fluctuation calculation can be implemented by an existing calculation method, for example, calculation based on relaxed monitoring.

Relaxed monitoring satisfies the following condition:
(SrxlevRef-Srxlev)<SSearchDeltaP Relaxed monitoring satisfies the following scenario:

Srxlev=current Srxlev value (dB) of the serving cell.

SrxlevRef=reference Srxlev value (dB) of the serving cell, which is set as follows:

after selecting or reselecting a new cell, or if (Srxlev−SrxlevRef)>0, or if TSearchDeltaP relaxed monitoring criteria have not been met:

the electronic device sets the value of SrxlevRef to the current Srxlev value of the serving cell;

if TSearchDeltaP=5 minutes, or if eDRX is configured and the eDRX cycle length exceeds 5 minutes, it is the eDRX cycle length.

Step 103: Set an offset value.

Step 104: Access the target cell according to the offset value.

In the embodiments of the present disclosure, after the target cell is determined, the electronic device needs to camp on the target cell. Considering that the electronic device selects the camping cell from multiple cells according to a preset algorithm, it is necessary to set the offset value. The offset value is used for the electronic device to use the determined target cell as the camping cell through calculation in the process of selecting the camping cell.

In some embodiments, when multiple cells are intra-frequency cells:

In intra-frequency reselection calculation (in the intra-frequency reselection, signals of the intra-frequency cells are sorted, and a cell with the highest ranking is a cell that needs to be reselected), it is set that the cell signal of the target cell is increased by the offset value, so that the cell signal of the target cell ranks the highest, where the offset value is greater than 0, that is, the RSRP of the target cell is increased by the offset value H>0. When the electronic device calculates whether the reselection meets the condition, H needs to be increased for the target cell.

Alternatively, in intra-frequency reselection calculation, it is set that a cell signal of a cell other than the target cell is increased by the offset value, so that the cell signal of the target cell ranks the highest, where the offset value is less than 0, that is, the cell signals of other cells are reduced, so that the cell signal of the target cell ranks the highest.

In some embodiments, when multiple cells are inter-frequency cells:

In inter-frequency reselection calculation (in inter-frequency reselection, it is determined based on whether the signal of the inter-frequency cell meets the network configuration threshold), a network configuration threshold of a cell other than the target cell is increased by the offset value, so that a network configuration threshold of the target cell is the highest, where the offset value is less than 0.

In the embodiments of the present disclosure, when the number of ping-pong reselections reaches the preset number of times, the target cell is determined from the multiple cells, and the offset value is set. Based on the offset value, the electronic device accesses the target cell through reselection calculation. In this way, when ping-pong reselection occurs, the electronic device determines the target cell from multiple cells and accesses the target cell through optimization processing, thereby reducing the power consumption of the electronic device and reducing the data service delay. Besides, the mobility of the electronic device is not affected.

Figure 2:
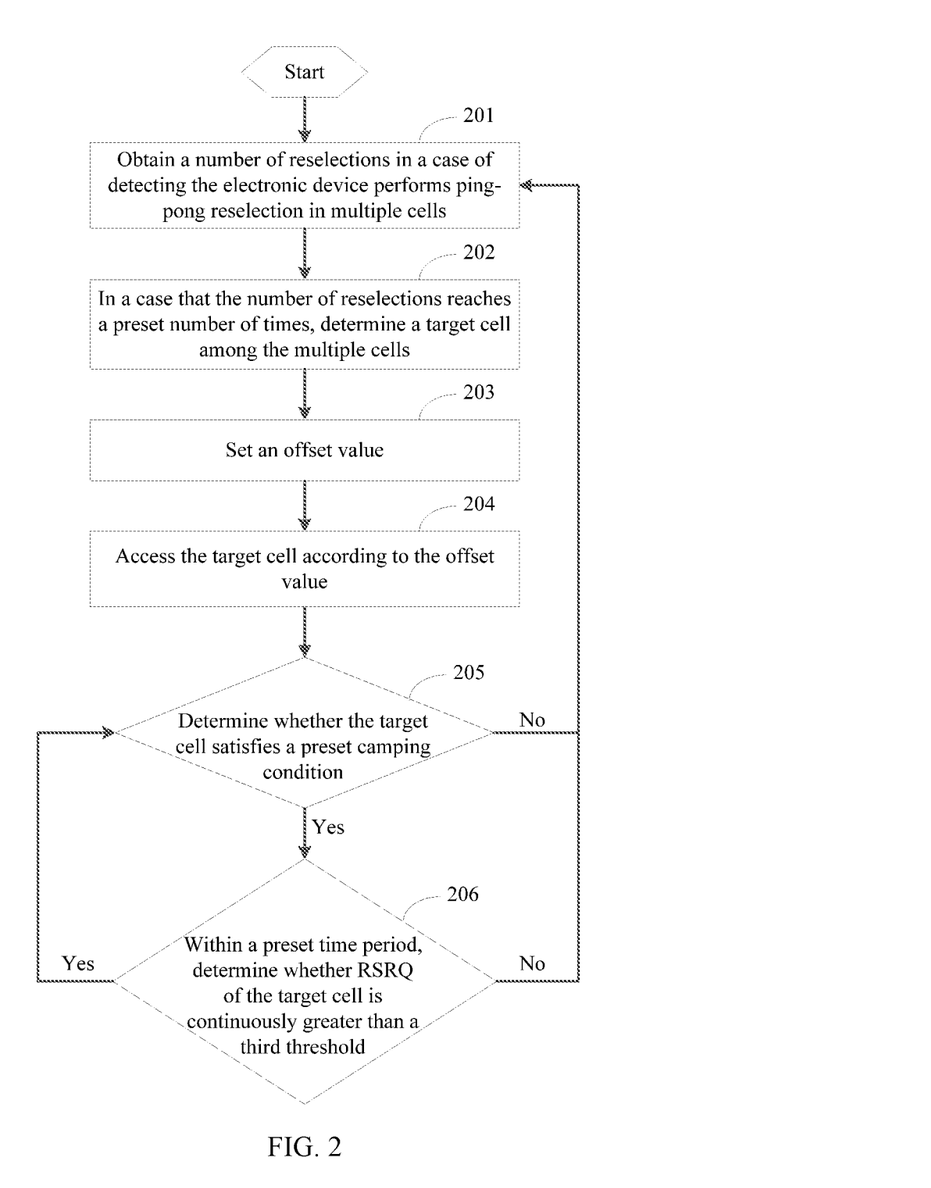
FIG. 2 is a schematic flowchart 2 of a cell reselection method according to an embodiment of the present disclosure.

Referring to FIG. 2, an embodiment of the present disclosure provides another cell reselection method. The method is performed by an electronic device, and includes the following steps:

Step 201: Obtain a number of reselections in a case of detecting that the electronic device performs ping-pong reselection in multiple cells.

Step 202: In a case that the number of reselections reaches a preset number of times, determine a target cell among the multiple cells.

Step 203: Set an offset value.

Step 204: Access the target cell according to the offset value.

For the description of the above steps 201 to 204, reference may be made to the description of the steps 101 to 104 in FIG. 1, and details are not repeated herein.

Considering that the camping cell may be affected by factors such as weather, environment, and network device status, which may cause signal fluctuation, it is necessary to continuously monitor the signal status of the target cell after the target cell is reselected in an optimized way.

Step 205: Determine whether the target cell satisfies a preset camping condition, and if yes, perform step 205; otherwise return to perform step 201.

In the embodiments of the present disclosure, when the target cell does not meet the preset camping condition, the target cell is canceled, that is, the optimization stops. For example, the target cell is previously determined to be cell A, and when it is detected that cell A does not meet the preset camping condition, the electronic device cancels the optimization, cell A is no longer the target cell, and the electronic device returns to step 201 to re-start the optimization to select a new target cell.

In some embodiments, the above-mentioned preset camping condition includes at least one of the following:

RSRQ is greater than a second threshold, where the second threshold can be denoted as Q2;

a Signal-to-Noise Ratio (SNR) is greater than a preset SNR value; and

RSRP is greater than a preset power value, where the preset power value may be denoted as P.

In the embodiments of the present disclosure, it is determined whether the target cell satisfies the camping condition: RSRQ>Q2 and RSRP>P. Once the condition is not satisfied, stop the optimization immediately. Alternatively, the SNR can also be considered, and the signal quality of the target cell can be determined based on the SNR or RSRQ.

Step 206: Within a preset time period, determine whether the RSRQ of the target cell is continuously greater than a third threshold, and if yes, return to perform step 205; otherwise, return to perform step 201.

In the embodiments of the present disclosure, when the target cell satisfies the preset camping condition, it continues to be detected whether the RSRQ of the target cell is continuously greater than the third threshold within a preset time period, and the third threshold value may be denoted as Q3, and if not, stop the optimization and return to perform step 201 to re-start the optimization to select a new target cell. If yes, return to perform step 205 to continue to determine whether the target cell satisfies the preset camping condition.

It should be noted that the third threshold is greater than the second threshold, that is, Q3>Q2, Q2 is used such that when the RSRQ of the target cell suddenly becomes very poor, the electronic device needs to stop the optimization immediately, and Q3 is used such that when finding that the current target cell is always bad, the electronic device stops optimization.

In the embodiments of the present disclosure, it is determined whether the target cell is suitable for continuing to camp according to the signal state of the target cell accessed by the electronic device, and the reselection of the target cell is performed when it is determined that the target cell is not suitable for continuing to camp, so that the electronic device can flexibly perform cell reselection to effectively reduce power consumption of electronic device and reduce the data service delay.

Figure 3:
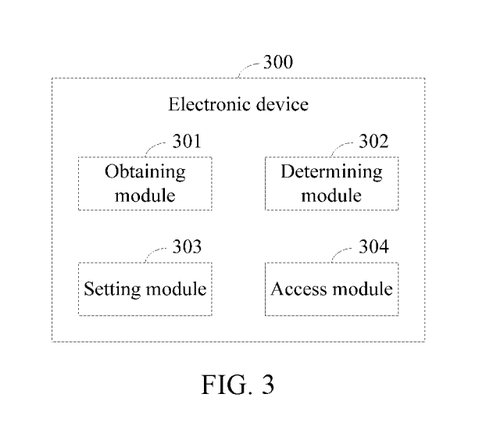
FIG. 3 is a schematic structural diagram 1 of an electronic device according to an embodiment of the present disclosure.

As shown in FIG. 3, an embodiment of the present disclosure provides an electronic device 300, including:

an obtaining module 301, configured to: in a case of detecting that the electronic device performs ping-pong reselection in multiple cells, obtain a number of reselections, where the number of reselections is a number of times of camping on a cell with the largest number of times of camping among the multiple cells;

a determining module 302, configured to: in a case that the number of reselections reaches a preset number of times, determine a target cell among the multiple cells, where reference signal received power RSRP fluctuation of the target cell is less than a preset fluctuation threshold, and reference signal received quality RSRQ within a camping period is greater than a first threshold;

a setting module 303, configured to set an offset value; and an access module 304, configured to access the target cell according to the offset value.

In some embodiments, the multiple cells are intra-frequency cells; and the access module 304 is further configured to:

in intra-frequency reselection calculation, set that the cell signal of the target cell is increased by the offset value, so that the cell signal of the target cell ranks the highest, where the offset value is greater than 0;

or in intra-frequency reselection calculation, set that a cell signal of a cell other than the target cell is increased by the offset value, so that the cell signal of the target cell ranks the highest, where the offset value is less than 0.

In some embodiments, the multiple cells are inter-frequency cells;

the access module 304 is further configured to:

in inter-frequency reselection calculation, increase a network configuration threshold of a cell other than the target cell by the offset value, so that a network configuration threshold of the target cell is the highest, where the offset value is less than 0.

In some embodiments, the electronic device further includes:

a first determining module, configured to determine whether the target cell satisfies a preset camping condition; and in a case that the target cell does not meet the camping condition, the first determining module is further configured to instruct the obtaining module to perform again the step of obtaining a number of reselections in a case of detecting that the electronic device performs ping-pong reselection in multiple cells; where The preset camping condition includes at least one of the following:

RSRQ is greater than a second threshold;

a signal-to-noise ratio SNR is greater than a preset SNR value; and

RSRP is greater than a preset power value.

In some embodiments, the electronic device further includes:

a second determining module, configured to: within a preset time period, determine whether RSRQ of the target cell is continuously greater than a third threshold, where the third threshold is greater than the second threshold;

in a case that the RSRQ is continuously greater than the third threshold within the preset time period, the first determining module is further configured to perform again the step of determining whether the target cell satisfies the preset camping condition; and in a case that the RSRQ is not continuously greater than the third threshold within the preset time period, the first determining module is further configured to instruct the obtaining module to perform again the step of obtaining a number of reselections in a case of detecting that the electronic device performs ping-pong reselection in multiple cells.

In the embodiments of the present disclosure, when the number of ping-pong reselections reaches the preset number of times, the target cell is determined from the multiple cells, and the offset value is set. Based on the offset value, the electronic device accesses the target cell through reselection calculation. In this way, when ping-pong reselection occurs, the electronic device determines the target cell from multiple cells and accesses the target cell through optimization processing, thereby reducing the power consumption of the electronic device and reducing the data service delay.

Figure 4:
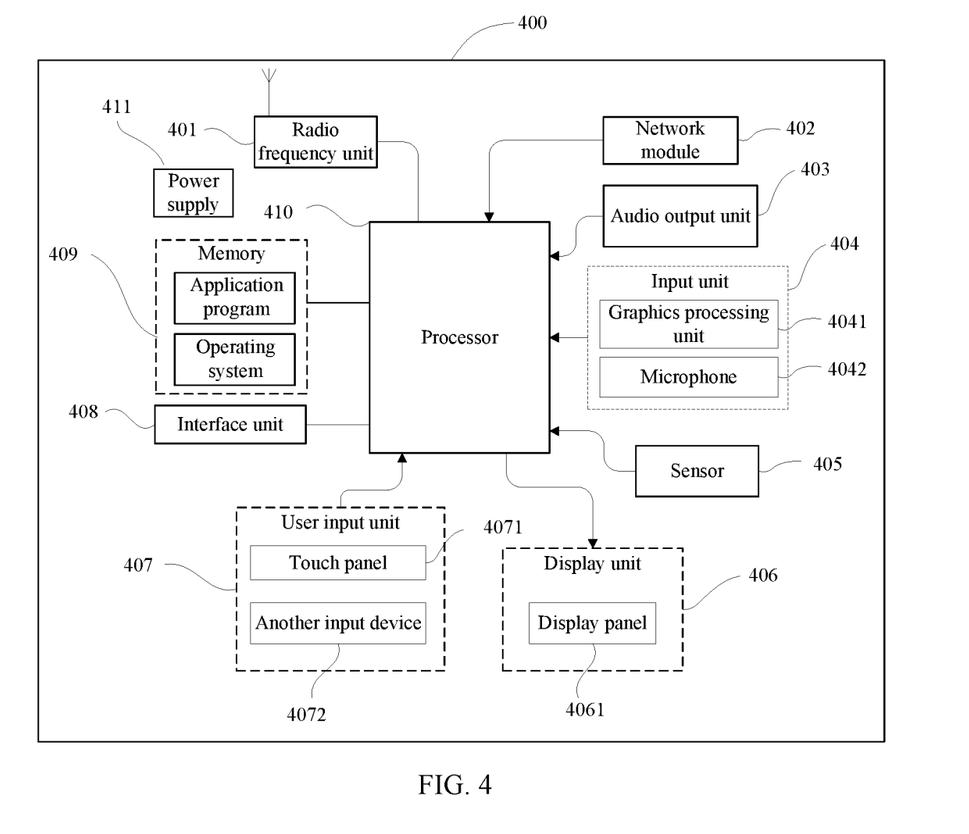
FIG. 4 is a schematic structural diagram 2 of an electronic device according to an embodiment of the present disclosure.

FIG. 4 is a schematic structural diagram of hardware of an electronic device implementing the embodiments of the present disclosure. As shown in the figure, the electronic device 400 includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and other components. A person skilled in the art may understand that a structure of the electronic device shown in FIG. 4 constitutes no limitation on the electronic device, and the electronic device may include more or fewer components than those shown in the figure, or have a combination of some components, or have a different component arrangement. In this embodiment of the present disclosure, the electronic device includes, but is not limited to, a mobile phone, a tablet computer, a notebook computer, a palmtop computer, a vehicle-mounted terminal, a wearable device, a pedometer, or the like.

In some embodiments, a computer program is stored in the memory 409 and can run on the processor 410, and when the computer program is executed by the processor 410, the following steps are performed: in a case of detecting that the electronic device performs ping-pong reselection in multiple cells, obtaining a number of reselections, where the number of reselections is a number of times of camping on a cell with the largest number of times of camping among the multiple cells;

in a case that the number of reselections reaches a preset number of times, determining a target cell among the multiple cells, where reference signal received power RSRP fluctuation of the target cell is less than a preset fluctuation threshold, and reference signal received quality RSRQ within a camping period is greater than a first threshold;

setting an offset value; and accessing the target cell according to the offset value.

In the embodiments of the present disclosure, when the number of ping-pong reselections reaches the preset number of times, the target cell is determined from the multiple cells, and the offset value is set. Based on the offset value, the electronic device accesses the target cell through reselection calculation. In this way, when ping-pong reselection occurs, the electronic device determines the target cell from multiple cells and accesses the target cell through optimization processing, thereby reducing the power consumption of the electronic device and reducing the data service delay.

It should be understood that, in this embodiment of the present disclosure, the radio frequency unit 401 may be configured to receive and send information or receive and send a signal in a call process. In some embodiments, after downlink data from a base station is received, the processor 410 processes the downlink data. In addition, uplink data is sent to the base station. Usually, the radio frequency unit 401 includes but is not limited to an antenna, at least one amplifier, a transceiver, a coupler, a low noise amplifier, a duplexer, and the like. In addition, the radio frequency unit 401 may communicate with a network and another device through a wireless communications system.

The electronic device provides users with wireless broadband Internet access through the network module 402, for example, helps users receive and send e-mails, browse web pages, and access streaming media.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, a call signal received voice, or a message received voice) related to a function implemented by the electronic device 400. The audio output unit 403 includes a speaker, a buzzer, a telephone receiver, and the like.

The input unit 404 is configured to receive an audio signal or a video signal. The input unit 404 may include a Graphics Processing Unit (GPU) 4041 and a microphone 4042. The graphics processing unit 4041 processes image data of a static image or video obtained by an image capture apparatus (for example, a camera) in a video capture mode or an image capture mode. A processed image frame may be displayed on the display unit 406. The image frame processed by the graphics processing unit 4041 may be stored in the memory 409 (or another storage medium) or sent by using the radio frequency unit 401 or the network module 402. The microphone 4042 may receive a sound and can process such sound into audio data. Processed audio data may be converted, in a call mode, into a format that can be sent to a mobile communication base station by using the radio frequency unit 401 for output.

The electronic device 400 further includes at least one sensor 405 such as a light sensor, a motion sensor, and another sensor. In some embodiments, the light sensor includes an ambient light sensor and a proximity sensor. The ambient light sensor may adjust luminance of the display panel 4061 based on brightness of ambient light. The proximity sensor may turn off the display panel 4061 and/or backlight when the electronic device 400 moves to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 405 may further include a fingerprint sensor, a pressure sensor, an iris sensor, a molecular sensor, a gyroscope, a barometer, a hygrometer, a thermometer, an infrared sensor, or the like. Details are not described herein again.

The display unit 406 is configured to display information input by a user or information provided for a user. The display unit 406 may include a display panel 4061, and the display panel 4061 may be configured in a form of a Liquid Crystal Display (LCD), an Organic Light-Emitting Diode (OLED), or the like.

The user input unit 407 may be configured to: receive entered digital or character information, and generate key signal input related to a user setting and function control of the electronic device. In some embodiments, the user input unit 407 includes a touch panel 4071 and another input device 4072. The touch panel 4071, also called a touch screen, may collect touch operation on or near the touch panel by users (for example, operation on the touch panel 4071 or near the touch panel 4071 by fingers or any suitable objects or accessories such as a touch pen by the users). The touch panel 4071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 410, and receives and executes a command sent by the processor 410. In addition, the touch panel 4071 may be implemented by using a plurality of types such as a resistive type, a capacitive type, an infrared ray, and a surface acoustic wave. The user input unit 407 may include other input devices 4072 in addition to the touch panel 4071. In some embodiments, the another input device 4072 may include but is not limited to: a physical keyboard, a function button (such as a volume control button, a switch button), a trackball, a mouse, and a joystick, which is not described herein.

Further, the touch panel 4071 may cover the display panel 4061. After detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. Although in FIG. 4, the touch panel 4071 and the display panel 4061 are configured as two independent components to implement input and output functions of the electronic device, in some embodiments, the touch panel 4071 and the display panel 4061 can be integrated to implement the input and output functions of the electronic device. Details are not limited herein.

The interface unit 408 is an interface for connecting an external apparatus with the electronic device 400. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 408 may be configured to receive input (for example, data information and power) from an external apparatus and transmit the received input to one or more elements in the electronic device 400 or may be configured to transmit data between the electronic device 400 and an external apparatus.

The memory 409 may be configured to store a software program and various data. The memory 409 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 409 may include a high-speed random access memory, and may further include a nonvolatile memory, for example, at least one magnetic disk storage device, a flash storage device, or another volatile solid-state storage device.

The processor 410 is a control center of the electronic device, connects all parts of the entire electronic device by using various interfaces and lines, and performs various functions of the electronic device and data processing by running or executing a software program and/or a module that are/is stored in the memory 409 and by invoking data stored in the memory 409, to overall monitor the electronic device. In some embodiments, the processor 410 may include one or more processing units. For example, an application processor and a modem processor may be integrated into the processor 410. The application processor mainly processes an operating system, a user interface, an application, and the like. The modem processor mainly processes wireless communications. It can be understood that, alternatively, the modem processor may not be integrated into the processor 410.

The electronic device 400 may further include the power supply 411 (for example, a battery) supplying power to each component. In some embodiments, the power supply 411 may be logically connected to the processor 410 by using a power management system, so as to implement functions such as charging management, discharging management, and power consumption management by using the power management system.

In addition, the electronic device 400 includes some function modules not shown, and details are not described herein.

An embodiment of the present disclosure further provides an electronic device, including a processor, a memory, and a computer program stored in the memory and executable on the processor. The computer program implements, when executed by the processor, each process of the foregoing method embodiments shown in FIG. 1 and FIG. 2, and a same technical effect can be achieved. To avoid repetition, details are not described herein.

The embodiments of the present disclosure further provide a computer-readable storage medium. The computer-readable storage medium stores a computer program, and when the computer program is executed by a processor, the processes in the method embodiments shown in FIG. 1 and FIG. 2 are implemented, and a same technical effect can be achieved. To avoid repetition, details are not described herein. The computer-readable storage medium is, for example, a Read-Only Memory (ROM), a Random Access Memory (RAM), a magnetic disk, or an optical disc.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (for example, a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A cell reselection method, performed by an electronic device, comprising:
in response to detecting that the electronic device performs ping-pong reselection in multiple cells, determining a cell among the multiple cells that has a largest number of times of being selected as a camping cell by the electronic device during the ping-pong reselection;
when the largest number of times of being selected as the camping cell reaches a preset number of times, determining a target cell among the multiple cells, wherein Reference Signal Received Power (RSRP) fluctuation of the target cell is less than a preset fluctuation threshold, and Reference Signal Received Quality (RSRQ) within a camping period is greater than a first threshold;
setting an offset value; and
accessing the target cell according to the offset value.

2. The cell reselection method according to claim 1, wherein
the multiple cells are intra-frequency cells; and
the accessing the target cell according to the offset value comprises:
in intra-frequency reselection calculation, increasing a cell signal of the target cell by the offset value such that the cell signal of the target cell is ranked as the highest among the multiple cells, wherein the offset value is greater than 0; or
in intra-frequency reselection calculation, increasing a cell signal of a cell other than the target cell by the offset value such that the cell signal of the target cell is ranked as the highest among the multiple cells, wherein the offset value is less than 0.

3. The cell reselection method according to claim 1, wherein
the multiple cells are inter-frequency cells.

4. The cell reselection method according to claim 1, wherein after accessing the target cell according to the offset value, the method further comprises:
determining whether the target cell satisfies a preset camping condition; and
when the target cell does not satisfy the preset camping condition, performing the determining a cell among the multiple cells that has the largest number of times of being selected as a camping cell by the electronic device during the ping-pong reselection in response to detecting that the electronic device performs ping-pong reselection in multiple cells, wherein the preset camping condition comprises at least one of the following:

RSRQ is greater than a second threshold;

a Signal-to-Noise Ratio (SNR) is greater than a preset SNR value; or

RSRP is greater than a preset power value.

5. The cell reselection method according to claim 4, wherein when the target cell satisfies the preset camping condition, the method further comprises:

within a preset time period, determining whether RSRQ of the target cell is continuously greater than a third threshold, wherein the third threshold is greater than the second threshold;

when the RSRQ is continuously greater than the third threshold within the preset time period, performing the determining whether the target cell satisfies the preset camping condition; and when the RSRQ is not continuously greater than the third threshold within the preset time period, performing the determining a cell among the multiple cells that has the largest number of times of being selected as a camping cell by the electronic device during the ping-pong reselection in response to detecting that the electronic device performs ping-pong reselection in multiple cells.

6. An electronic device, comprising: a memory having a computer program stored thereon; and a processor, wherein the computer program, when executed by the processor, causes the processor to perform operations comprising:

in response to detecting that the electronic device performs ping-pong reselection in multiple cells, determining a cell among the multiple cells that has a largest number of times of being selected as a camping cell by the electronic device during the ping-pong reselection;

when the largest number of times of being selected as the camping cell reaches a preset number of times, determining a target cell among the multiple cells, wherein Reference Signal Received Power (RSRP) fluctuation of the target cell is less than a preset fluctuation threshold, and Reference Signal Received Quality (RSRQ) within a camping period is greater than a first threshold;

setting an offset value; and accessing the target cell according to the offset value.

7. The electronic device according to claim 6, wherein the multiple cells are intra-frequency cells; and the operations further comprise:

in intra-frequency reselection calculation, increasing a cell signal of the target cell by the offset value such that the cell signal of the target cell is ranked as the highest among the multiple cells, wherein the offset value is greater than 0; or in intra-frequency reselection calculation, increasing a cell signal of a cell other than the target cell by the offset value such that the cell signal of the target cell is ranked as the highest among the multiple cells, wherein the offset value is less than 0.

8. The electronic device according to claim 6, wherein the multiple cells are inter-frequency cells.

9. The electronic device according to claim 6, wherein the operations further comprise:

determining whether the target cell satisfies a preset camping condition; and when the target cell does not satisfy the preset camping condition, performing the determining a cell among the multiple cells that has the largest number of times of being selected as a camping cell by the electronic device during the ping-pong reselection in response to detecting that the electronic device performs ping-pong reselection in multiple cells, wherein the preset camping condition comprises at least one of the following:

RSRQ is greater than a second threshold;

a Signal-to-Noise Ratio (SNR) is greater than a preset SNR value; or

RSRP is greater than a preset power value.

10. The electronic device according to claim 9, wherein the operations further comprise:

within a preset time period, determining whether RSRQ of the target cell is continuously greater than a third threshold, wherein the third threshold is greater than the second threshold;

when the RSRQ is continuously greater than the third threshold within the preset time period, performing the determining whether the target cell satisfies the preset camping condition; and when the RSRQ is not continuously greater than the third threshold within the preset time period, performing the determining a cell among the multiple cells that has the largest number of times of being selected as a camping cell by the electronic device during the ping-pong reselection obtaining a number of reselections in response to a case of detecting that the electronic device performs ping-pong reselection in multiple cells.

* * * * *